United States Patent [19]

Nelson

[11] Patent Number: 4,526,406
[45] Date of Patent: Jul. 2, 1985

[54] WELLHEAD CONNECTOR

[76] Inventor: Norman A. Nelson, 6902 Wagon Wheel La., Houston, Tex. 77088

[21] Appl. No.: 301,530

[22] Filed: Sep. 14, 1981

Related U.S. Application Data

[63] Continuation-in-part of Ser. No. 284,010, Jul. 16, 1981, abandoned.

[51] Int. Cl.³ ............................................. F16L 35/00
[52] U.S. Cl. ..................................... 285/18; 285/315; 285/320; 285/DIG. 21
[58] Field of Search ................... 285/34, 35, 315, 316, 285/DIG. 21, 18, 320

[56] References Cited

U.S. PATENT DOCUMENTS

| | | | |
|---|---|---|---|
| 3,097,866 | 7/1963 | Iversen | 285/91 X |
| 3,222,088 | 12/1965 | Haeber | 285/316 X |
| 3,321,217 | 5/1967 | Ahlstone | 285/315 X |
| 3,339,947 | 9/1967 | Maisey | 285/320 X |
| 4,057,267 | 11/1977 | Jansen | 285/DIG. 21 |
| 4,114,928 | 9/1978 | Lochte | 285/18 |
| 4,335,904 | 6/1982 | Saliger et al. | 285/DIG. 21 |

FOREIGN PATENT DOCUMENTS

| | | |
|---|---|---|
| 1314816 | 4/1973 | United Kingdom . |
| 1501577 | 2/1978 | United Kingdom . |
| 1572633 | 7/1980 | United Kingdom . |
| 1604826 | 12/1981 | United Kingdom . |
| 2084680A | 4/1982 | United Kingdom . |

Primary Examiner—Dave W. Arola
Attorney, Agent, or Firm—Browning, Bushman, Zamecki & Anderson

[57] ABSTRACT

The invention pertains to a connector for connection to a wellhead in generally coaxial alignment therewith. The connector includes a generally tubular main body and latches carried by the main body for radial extension and retraction with respect thereto to engage the wellhead and latch the connector to it. A set of circumferentially spaced support members are also carried by the main body longitudinally adjacent the latches for radial extension and retraction at least partially independently of the latches. The support members and main body have abutting slide surfaces extending parallel to the path of movement of the support members, while the support dogs and the latches have abutting support surfaces inclined with respect to said path of movement for wedging the latches longitudinally as the support members are extended. An actuator on the main body is operatively associated with the latches and support members to extend them successively toward the wellhead.

18 Claims, 10 Drawing Figures

FIG. 10

WELLHEAD CONNECTOR

CROSS REFERENCE TO RELATED APPLICATION

This is a continuation-in-part of application Ser. No. 284,010, filed July 16, 1981 and now abandoned.

BACKGROUND OF THE INVENTION

The invention pertains particularly to wellhead connectors of the type which are connected to subsea wellheads to provide a means for mounting blowout preventor stacks or other apparatus on such wellheads. However, in its broader aspects, the invention may be more generally applied to systems for connecting two tubular bodies in generally coaxial alignment. Such wellhead connectors typically include latches carried on some type of generally tubular main body. The latches may be extended radially inwardly, either by a pivotal type movement or a rectilinear type movement, to engage cooperative profiles on the wellhead to latch the main body to the wellhead. The latches and cooperative wellhead profiles are typically configured, i.e. with mating inclined surfaces, so that, at least in theory, as the latches are urged radially inwardly into tighter engagement with the wellhead, the connection is also tightened longitudinally, a firm connection being important for any number of reasons well known in the art. Accordingly, various systems have been devised for so urging the latches radially inwardly with a high mechanical advantage. However, it has been found that, in practice, the application of high radial forces to the latches with such systems simply does not result in the tight connection between the connector body and wellhead which should theoretically result.

It is believed that at least one reason for this undesirable phenomenon is that the industry standards concerning wellhead materials require metalurgical properties which, while making the wellhead resistant to corrosion, etc., also necessitate the use of a relatively soft metal in the wellhead. Then, the high radial forces being applied to the latches, rather than effectively utilizing the inclined surfaces on the latches and wellhead to tighten the connection longitudinally, may simply cause the latches to dig into and deform the wellhead material without effecting any further longitudinal movement.

SUMMARY OF THE INVENTION

The connector apparatus of the present invention includes a generally tubular main body with latch means carried thereby for generally radial extension and retraction toward and away from a wellhead configured to mate with said latches. Additionally, the main body of the connector carries support means radially extendable and retractable at least partially independently of the latch means. The support means are configured and arranged so that, when radially extended, they tighten the connection between the wellhead and the connector body with a wedging action. The apparatus is further provided with actuator means for extending the latches and support means successively radially toward the wellhead.

Because of the provision of the separate support means and their extension successively after the latches, the problem of deformation of the material of the wellhead can be avoided and a firm connection achieved. More specifically, the latches can be extended to substantially their full radially inner limits into a latching position with respect to the wellhead without the need for the exertion of any substantial longitudinal forces between the latches and wellhead. Thus, the latches are placed in their latching position without any danger of digging into the wellhead material. The support means may be partially radially extended along with the latches. In any event, they are subsequently extended or further extended to tighten the engagement between the latches and wellhead in the longitudinal direction. Because the latches are already in their radially inner positions, there is still no danger of them digging into the wellhead. Rather, the major relative radial movement which tightens the connection longitudinally is between the support means, the latches, and the body on which they are carried, all of which can be formed of sufficiently hard materials with improved friction characteristics.

In one preferred embodiment of the invention, the latches comprise a set of latch dogs spaced circumferentially from one another about the connector body. The support means in turn comprise a set of support members in the form of circumferentially spaced wedges engaged in one-to-one relation with respective latch dogs. Link means are preferably provided interconnecting the latch dogs and support members to limit relative radial movement therebetween. The amount of relative radial movement permitted by the link means may be less than the total amount of radial movement of the support members during their extension and retraction. Thus, after partial retraction of the support members, by release means cooperative between those support members and the drive means, further retraction of the support members will cause retraction of the latch dogs.

The actuator means is preferably in the form of a longitudinally extendable and retractable drive means, such as an annular piston, mounted in the connector body. In one preferred embodiment, this piston has cam surfaces arranged in a generally stepped configuration engagable with the latch dogs and support members for successive extension thereof. In a longitudinally extended position, the piston radially abuts the latch dogs and support members to retain them in the radially extended positions. Lock means may be provided in association with the drive means for locking the latter in its longitudinally extended position and thus, in turn, locking the latch dogs and support members in their radially extended positions.

As mentioned above, a release means is preferably also provided, cooperative between the drive means and support members, to at least partially radially retract the support members at the drive means or piston is longitudinally retracted.

Accordingly, it is a principal object of the present invention to provide an improved wellhead connector.

It is a more general object of the invention to provide an improved means for connecting two tubular bodies in generally coaxial alignment.

It is another object of the present invention to provide a wellhead connector having at least partially independently radially movable latches and support means, the latter, when extended, wedging with respect to the former and the body on which they are carried.

Still another object of the present invention is to provide means for releasing the support means along with link means cooperative between the support means and the latch means for assisting in retraction of the latch means.

Still other objects, features, and advantages of the present invention will be made apparent by the following detailed description of an exemplary embodiment, the drawings, and the claims.

DETAILED DESCRIPTION

Figure 1:
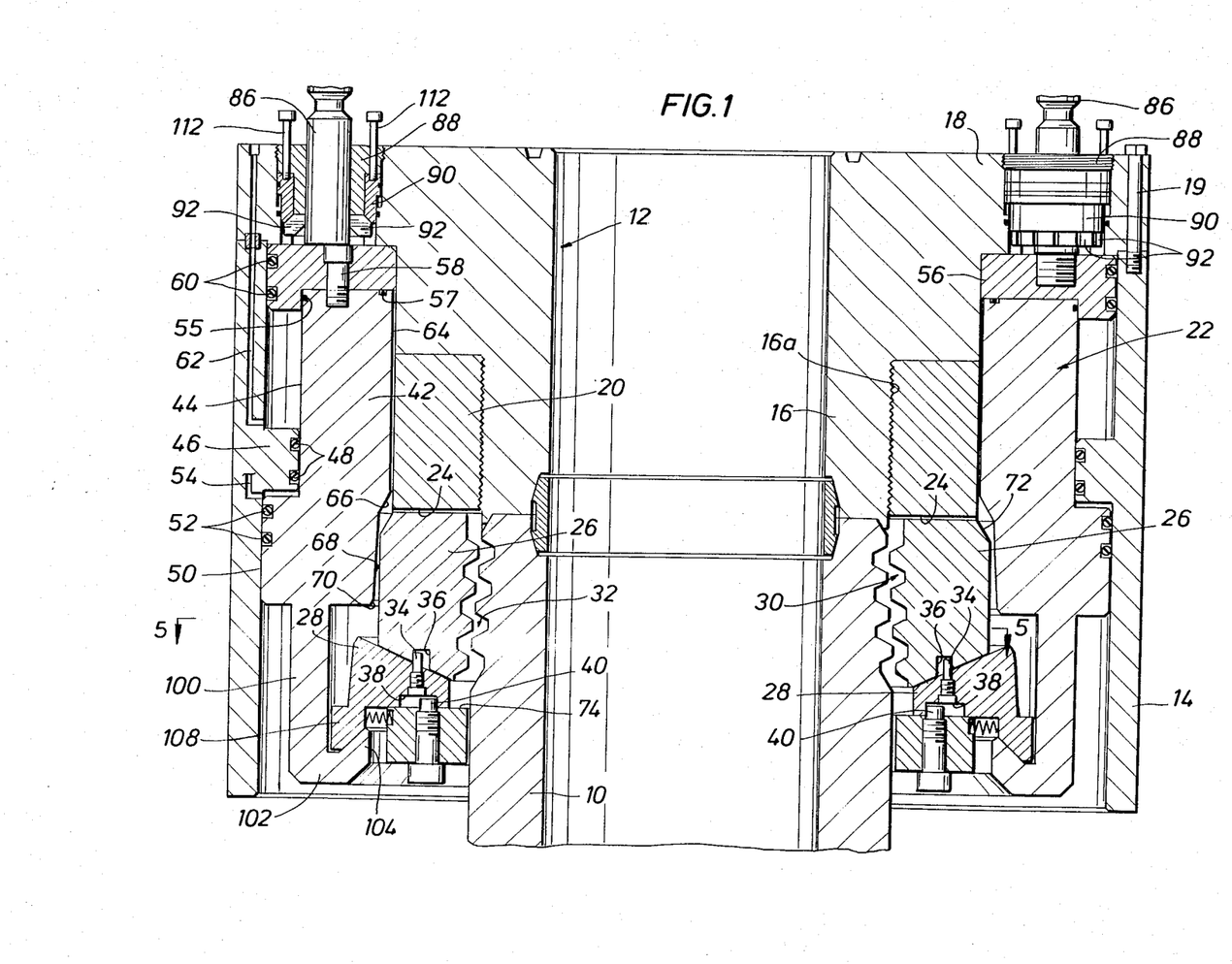
FIG. 1 is a longitudinal cross-sectional view through a wellhead and wellhead connector in accord with the present invention, with the latches and the support dogs in their fully retracted positions.

FIG. 1 shows a typical wellhead 10 and a wellhead connector, generally denoted by the numeral 12, for connection thereto. Connector 12 may in turn mount a blowout preventor stack or any other apparatus which is to be ultimately connected to the wellhead 10. Connector 12, as a whole, is tubular and is to be connected to wellhead 10 in generally coaxial alignment. More specifically, connector 12 includes a tubular main body comprising an annular outer wall 14 and an annular inner wall 16. Inner wall 16 has an integral flange 18 extending radially outwardly from its upper end and connected to outer wall 14 by screws 19. The main body further includes a generally cylindrical cage 20 which is threadedly connected to a reduced diameter portion 16a of inner wall 16 and extends downwardly therefrom to form an extension of said inner wall. The outer wall 14 is radially spaced from inner wall 16 and its extension 20 so that an annular space is formed therebetween. An actuator in the form of a longitudinally reciprocable annular piston 22, to be described more fully below, is mounted in said annular space.

Figure 5:
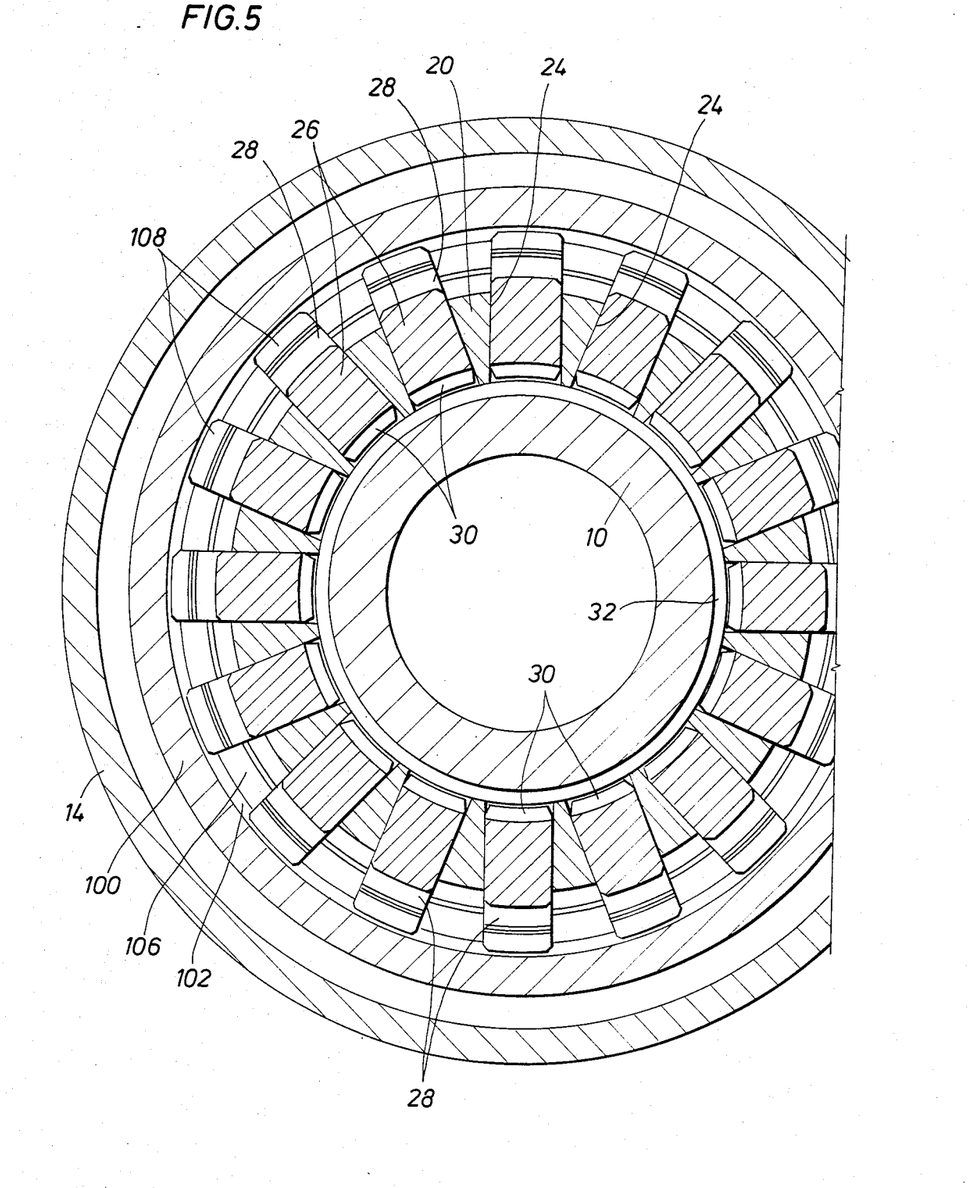
FIG. 5 is a transverse cross-sectional view taken along the lines 5—5 in FIG. 1.

As may be seen by comparing FIGS. 1 and 5, cage 20 has a plurality of circumferentially spaced windows 24 opening radially therethrough. The latches for the wellhead connector are formed by a first set of members, specifically latch dogs 26, each of which is mounted in a respective one of the windows 24 in cage 20. A second set of members, specifically wedges 28, is provided to form the support means of the device. Each wedge 28 is mounted in a respective one of the windows 24 below the respective latch dog 26.

Latch dogs 26 have, on their radially inner sides, saw tooth formations generally denoted by the numeral 30 configured to mate with circumferential grooves which define similar saw tooth formations 32 on the outer diameter of wellhead 10 near its upper end. It can be seen that, if the latch dogs 26 are extended radially inwardly so that formations 30 and 32 are matingly engaged, the wellhead connector will be effectively latched to the wellhead 10. Each support wedge 28 carries a pin 34 which extends upwardly from the support wedge 28 and into a slot 36 in the respective latch dog 26 thereabove. Pins 34 and slots 36 permit limited relative radial movement between the latch dogs 26 and support wedges 28 in a manner to be described more fully below. Similarly, each support wedge 28 has a slot 38 receiving a respective pin 40 mounted in cage 20 and extending upwardly into the respective one of the windows 24. Pins 40 and slots 38 permit limited relative radial movement between support wedges 28 and cage 20 and serve to retain wedges 28 from becoming completely dislodged from cage 20, dogs 26 in turn being retained with respect to wedges 28 by pins 34.

Piston 22 includes a cylindrical member 42 having a portion 44 of reduced outer diameter, portion 44 being engaged by an annular flange 46 extending radially inwardly from outer body wall 14. The inner surface of flange 46 is sealed with respect to reduced diameter portion 44 of the piston by O-rings 48, and the enlarged diameter portion 50 of the piston member 42 below portion 44 is sealed with respect to wall 14 by O-rings 52. Accordingly, a first piston head is defined by the annular area of portion 50 between O-rings 48 and O-rings 52. If fluid pressure is admitted to the area between flange 46 and piston portion 50 through a passageway, partially shown at 54, the piston may be urged downwardly. The piston assembly further comprises a ring 56 fixed to the upper end of member 42 by screws 58. Ring 56 is sealed with respect to member 42 by O-rings 55 and 57. The outer diameter of ring 56 is the same as that of portion 50 of piston member 42 and is sealed with respect to outer body wall 14 by O-rings 60. Thus, if fluid pressure is admitted to the area between flange 46 and the second piston head formed by ring 56 through passageway 62, the piston assembly 42, 56 can be urged upwardly.

FIG. 1 shows piston assembly 42, 56 in its uppermost position, which will be referred to herein as its "longitudinally retracted" position, and the members 26 and 28 in their radially outermost positions, which will be referred to herein as their "radially retracted" positions. These are the positions in which the parts would be disposed as the wellhead connector is lowered over wellhead 10. Suitable guide means (not shown) would be provided to coaxially align the wellhead connector and wellhead. Downward movement would be stopped by abutment of the lower end of inner body wall 16 with the upper end of wellhead 10 as shown in FIG. 1. At such point, the formations 30 and 32 are then in alignment with each other.

To bring these formations into latching engagement, fluid pressure would be admitted through passageway 54 to lower piston 22. (While various steps in the latching and unlatching process are shown in various figures, it will be helpful to also refer to FIG. 1 throughout the description of the operation of the tool.) The inner surface of piston member 42 has a generally stepped configuration including an uppermost straight vertical section 64. Adjoining the lower end of section 64 is a downwardly and radially outwardly inclined section 66. Adjoining the lower end of section 66 is a section 68 which, while it is also downwardly and radially outwardly inclined, has a much smaller radial component of direction so that it is more mearly vertical than section 66. Finally, adjoining the lower end of section 68, is a short section 70 inclined at about the same angle as section 66. As piston 22 is lowered, section 66 of the inner surface of piston member 42 will come into engagement with matingly inclined surfaces 72 formed at the upper outer corners of latch dogs 26. Accordingly, as piston 22 is further lowered, surfaces 66 and 72 will act as cam surfaces to push latch dogs 26 radially inwardly. Because pins 34 are disposed at the outer extremities of recesses 36, wedges 28 will be urged inwardly along with dogs 26. Support wedges 28 have horizontal lower surfaces which slidingly engage the horizontal surfaces 74 at the bottoms of windows 24 to slidingly guide the wedges 28, and thus indirectly the dogs 26, in such radially inward movement.

Figure 2:
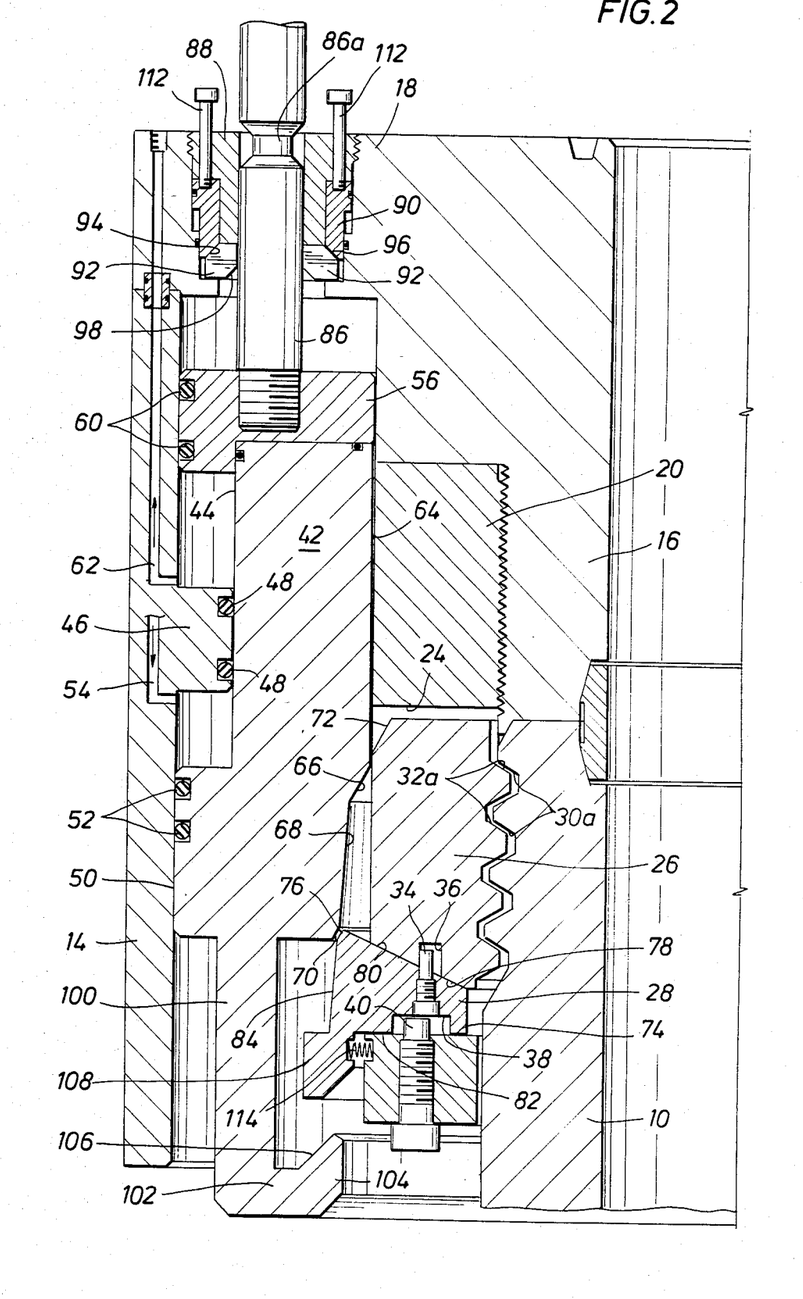
FIG. 2 is an enlarged partial sectional view through the apparatus of FIG. 1 with the latches fully extended and the support dogs partially extended.

FIG. 2 shows pertinent portions of the apparatus part way through the downward stroke of piston 22, and more specifically, after cam surface 66 of the piston has moved downwardly past cam surfaces 72 of latch dogs 26. It can be seen that, at this point, latch dogs 26 are in substantially their innermost positions with formations 30 and 32 in latching engagement. In other words, the generally upwardly facing surfaces 32a on the saw tooth formations of dogs 26 and the generally downwardly facing surfaces 30a on the grooves of the wellhead have been brought into opposition with each other whereby they may serve as latching surfaces to prevent upward movement of the wellhead connector from the wellhead. However, even though latch dogs 26 have been moved to substantially their full radially extended position, the connection has not yet been tightened longitudinally since wedges 28 are still in their radially outer positions with respect to dogs 26.

As previously mentioned, the latching surfaces 30a of latch dogs 26 face generally upwardly. The generally downwardly facing underside 78 of each latch dog 26 abuts a generally upwardly facing surface 80 of the respective support wedge 28. Opposed surfaces 78 and 80 will be referred to herein as "support surfaces" since they support dogs 26 or resist movement thereof longitudinally in a direction which would tend to separate latching surfaces 30a and 32a. Wedges 28 are in turn supported by their lower surfaces 82 on the upwardly facing surfaces 74 of windows 24, surfaces 74 and 82 being referred to herein as "slide surfaces." In accord with the present invention, after latch dogs 26 have been substantially fully extended, support wedges 28 are successively urged further radially inwardly, wedging between support surfaces 78 of the latch dogs 26 and slide surfaces 74 of the cage 24. Because the opposed support surfaces 78 and 80 of the respective latch and support dogs are inclined radially outwardly and longitudinally upwardly, such further radially inward extension of wedges 28 will tighten the connection with the wellhead, more specifically, the engagement between generally longitudinally facing latch surfaces 30a and 32a, without any substantial additional radially inward movement of the latch dogs 26. Accordingly, latch dogs 26 will not dig into the relatively soft metal of wellhead 10 thereby thwarting the effort to tighten the connection, as occurs in prior art devices. Rather, during the tightening portion of the operation of the tool, all substantial relative radial movement is between support wedges 28, on the one hand, and latch dogs 26 and cage 24, on the other, and all of these parts can be formed of harder metals than wellhead 10 and can include surface finishes or treatments which insure minimum friction. Dogs 26 are thus wedged upwardly into tight engagement with the wellhead.

More particularly, the additional radial extension of wedges 28 is accomplished by further downward movement of piston 22. Referring again to FIG. 2, after cam surface 66 and 72 have moved past each other, surface 70 will come into engagement with matingly inclined surfaces 76 formed on the upper outer corners of wedges 28 to cam the latter further radially inwardly. This accomplishes the wedging type tightening described above. Then, surface 68 of piston member 42 will come into alignment with the radially outer surfaces 84 of dogs 28. Surfaces 68 and 84 are matingly inclined, and although their radial component of direction is very small, they will accomplish a further slight camming effect on wedges 28 to fully tighten the connection between the wellhead 10 and the wellhead connector.

Figure 3:
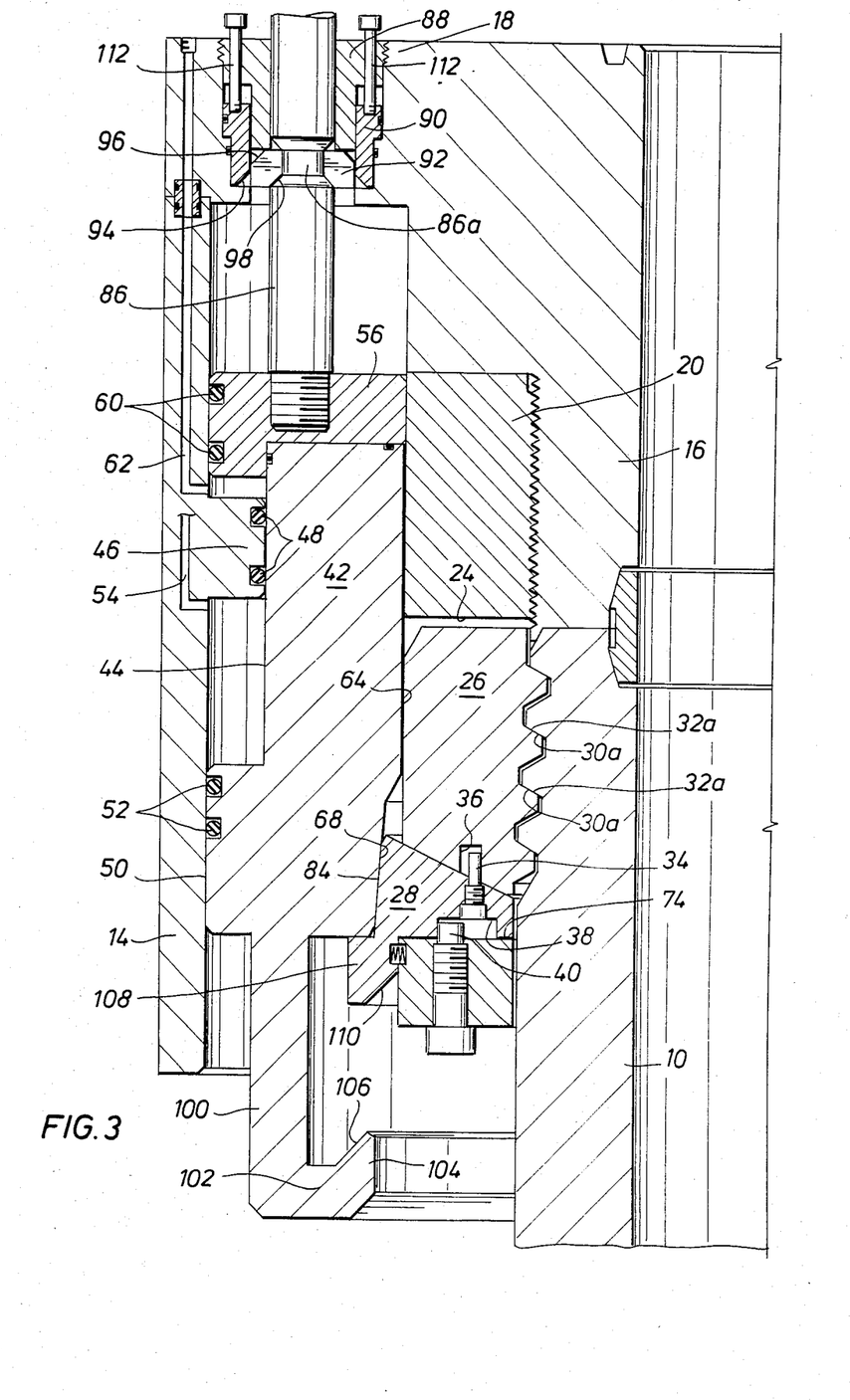
FIG. 3 is a view similar to FIG. 2 with the latches and support dogs fully extended and the actuator piston locked in its extended position.

FIG. 3 shows the apparatus with piston 42, 56 in its fully extended or lower position, and with members 26 and 28 in their fully extended or radially inner positions. In this position, surface 64 of piston member 42 radially abuts the outer side of latch dogs 26, while surface 68 similarly abuts the radially outer sides of wedges 28 to retain the dogs and wedges in their extended positions. Piston 42, 56 can be locked in this position by a mechanism shown in the unlocked configuration in FIGS. 1 and 2 and in the locked configuration in FIG. 3. The locking mechanism cooperates with a pair of rods 86 threaded into ring 56 of the piston assembly and extending longitudinally therefrom through respective bushings 88 mounted in the flange 18 of the main body of the wellhead connector. Each bore in flange 18 in which a bushing 88 is mounted is larger than the bushing so that it may also receive an annular piston 90, surrounding a lower, reduced-outer-diameter portion of the bushing 88, and a set of dog elements 92 mounted below both bushing 88 and piston 90. Piston 90 and dogs 92 have abutting downwardly and radially outwardly inclined cam surfaces 94 and 96 respectively. Rod 88 has its outer diameter, in general, sized for a sliding fit in bushing 88, the inner surfaces of dogs 92 also sliding against the outer diameter of rod 86. However, rod 86 has, intermediate its ends, a necked down or reduced-diameter portion 86a. Rod 86 is further beveled both above and below necked down portion 86a.

Referring now again to FIG. 3, as the main drive piston 42, 56 moves downwardly, each rod 86 moves therewith until its necked down portion 86a is in alignment with dog elements 92. This opens up a space for potential radially inward movement of dog elements 92. To effect such movement, fluid pressure is applied to the upper side of piston 90 through passageways (not shown), and as piston 90 moves downwardly, surfaces 94 and 96 cam dog elements 92 radially inwardly into engagement with necked down portion 86a of rod 86. Piston 90 then moves in behind (or radially outwardly of) dog elements 92 to retain them in that position as shown in FIG. 3. It should be noted that, in such locking position, the downwardly and radially outwardly beveled surface on rod 86 below its necked down portion 86a abuts matingly beveled surfaces 98 on dog elements 92.

When it is desired to release the wellhead connector from wellhead 10, the locking mechanism is first disengaged. This is accomplished by applying fluid pressure, via passageways (not shown), to urge each piston 90 upwardly thus freeing dog elements 92 for potential radially outward movement with respect to rod 86. Fluid pressure is then applied to upper piston head 56 of the main drive piston through passageway 62. As piston member 42 moves upwardly, and surfaces 64 and 68 thereof move out of alignment with respective sets of members 26 and 28, the latter are freed for potential retraction. To ensure such retraction, a release mechanism is provided. This mechanism includes a sleeve 100 formed integrally with piston member 42 and extending downwardly therefrom. At the lower end of sleeve 100 is an annular flange 102 which extends radially inwardly terminating in an upturned lip 104 having an upwardly and radially inwardly inclined upper surface 106. Each of the support wedges 28 has a tang 108 extending downwardly from its outer lower corner and having a surface 110 on its underside inclined to correspond with the inclination of surface 106 on lip 104.

Figure 4:
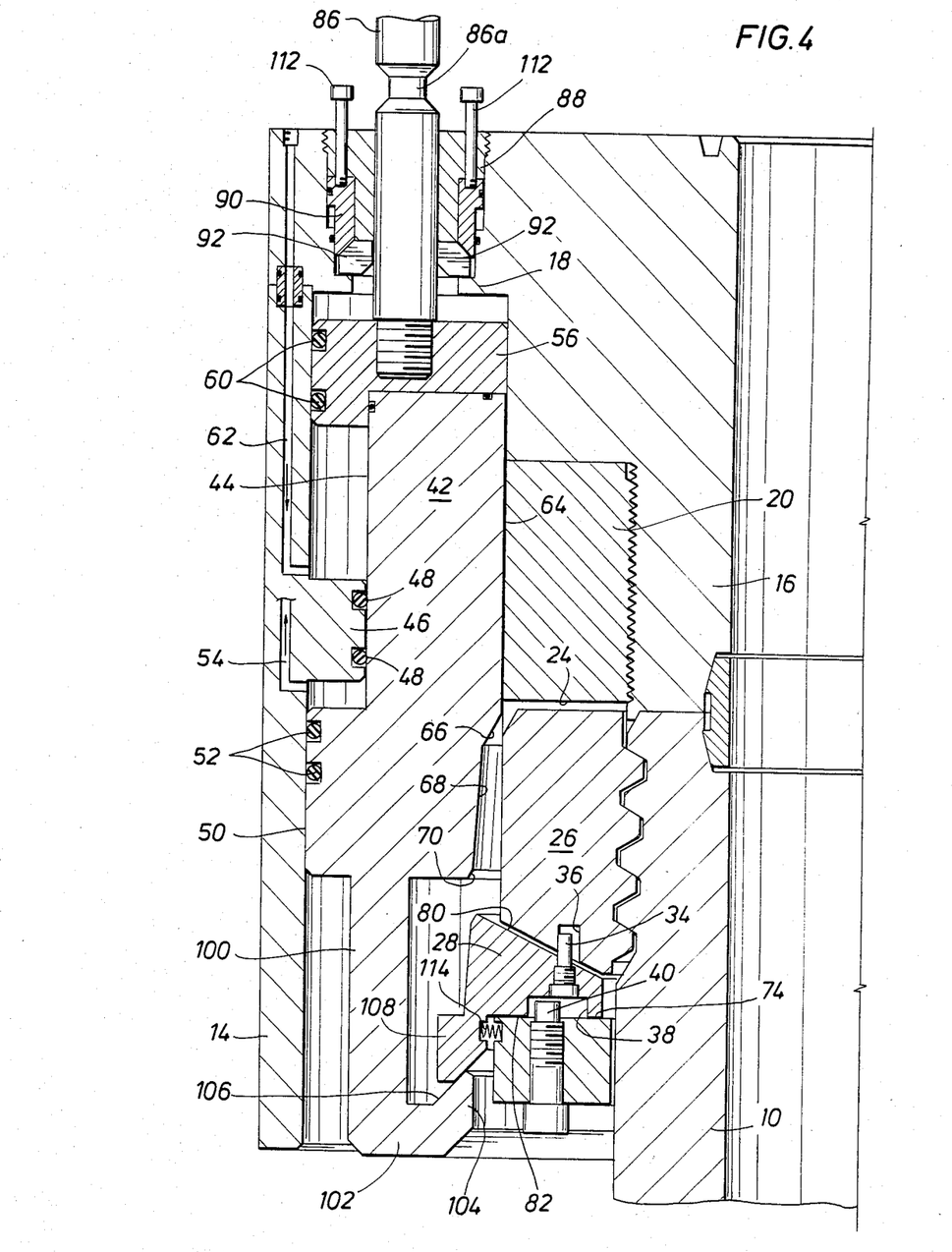
FIG. 4 is a view similar to that of FIGS. 2 and 3 showing the actuator piston and support dogs partially retracted.

As piston 42, 56 moves upwardly, surfaces 106 and 108 will come into engagement with each other and cam the support wedges 28 radially outwardly as shown in FIG. 4. Wedges 28 will first move outwardly with respect to dogs 26 to the extent permitted by pins 34 and slots 36. FIG. 4 shows the apparatus at such point in the retraction process. From that point, further upward movement of piston 42, 56 and consequent camming action of surfaces 106 and 110 will cause members 28 and 26 to move outwardly jointly by virtue of the engagement of pins 34 with the radially outer extremities of slots 36. Meanwhile, the beveled surfaces on rods 88 below their necked down portions 86a will have cammed dog elements 92 radially outwardly, i.e. back to the position shown in FIGS. 1 and 2, so that, ultimately, the entire apparatus returns to its fully retracted position shown in FIG. 1. The locking mechanism is provided with a manual override in the form of pins 112 connected to piston 90 and slidably extending outwardly through bushing 88 so that their heads can be engaged to force piston 90 upwardly mechanically. Compression springs 114 are provided between cage 20 and support wedges 28 to aid them in returning to their radially retracted positions.

FIGS. 6-10 show a second embodiment of wellhead connector according to the present invention. The connector is adapted for connection to a wellhead 200 whose upper profile includes a radially outwardly extending flange 202, the underside of which defines a generally downwardly facing annular latching surface 204. The wellhead connector includes a generally tubular main body which comprises a generally cylindrical inner portion 206 having at its lower end a radially outwardly extending flange 208 adapted to abut and form a mirror image of flange 202 of the wellhead 200. Spaced upwardly from flange 208 is another annular radially outwardly extending flange 210 to which is bolted the outer portion of the main body of the connector. More specifically, said outer portion includes an upper annular plate 212 bolted to flange 210 by bolts 214 and extending radially outwardly, a cylindrical outer wall 216 welded or otherwise rigidly affixed to the outer extremity of plate 212 and extending downwardly therefrom, and a lower annular support plate 220 secured by screws 218 to lower end of wall 216 and extending inwardly therefrom. As shown, the outer portion 212, 216, 220 of the connector main body is generally C-shaped in cross sections, and an annular space 222 is defined between the inner and outer portions of the connector main body.

Figure 6:
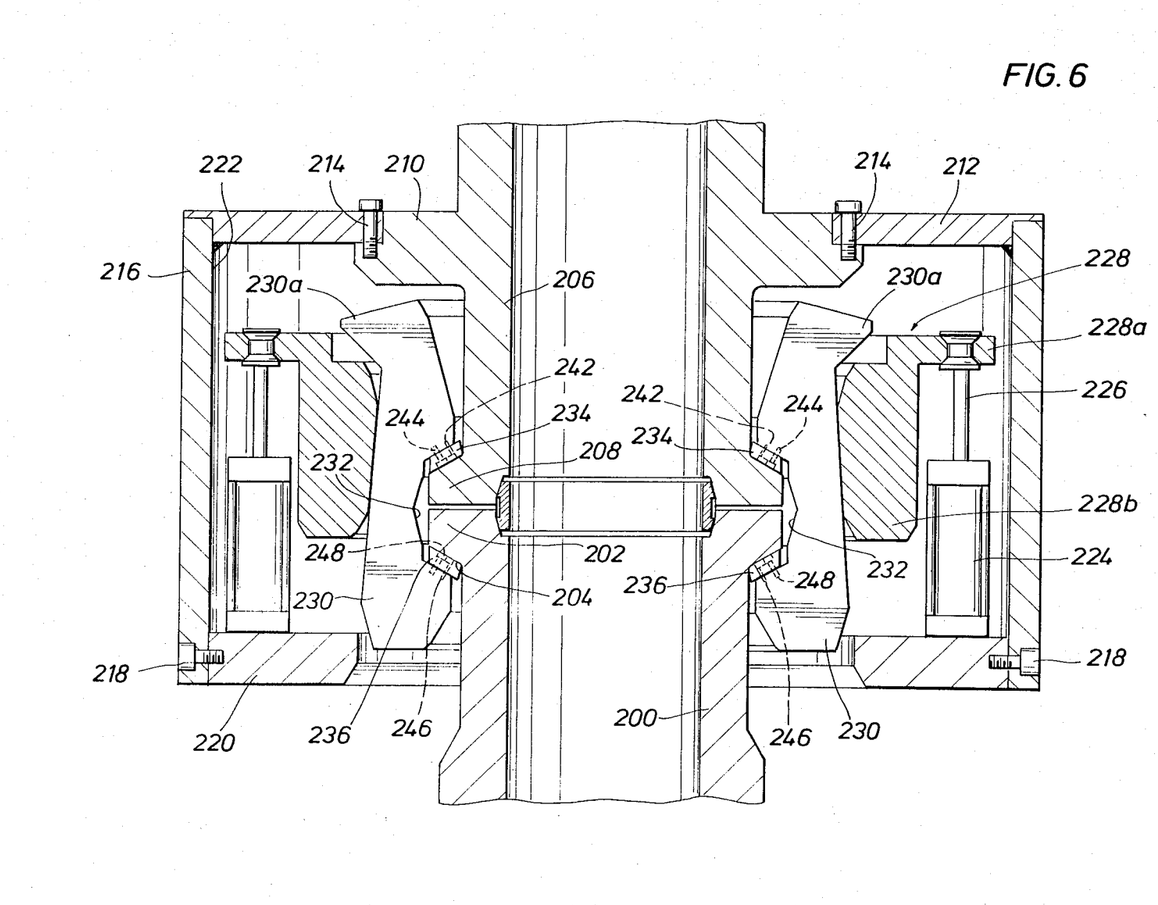
FIG. 6 is a longitudinal cross-sectional view through a second embodiment of wellhead connector in accord with the present invention, with the latch means fully extended.

An annular piston and cylinder assembly 214 is mounted on the upper side of plate 220. Its annular piston rod 226 extends upwardly and has an annular cam member 228 rigidly secured to its upper end. Cam member 228 includes a generally horizontal flange 228a secured to piston rod 226, and a cam proper 228b depending downwardly from the radially inner extremity of flange 228a. The piston and cylinder assembly 224 together with the attached cam ring 228 form the actuator means for the connector.

FIG. 6 shows the actuator means in an intermediate position between the ends of its stroke. In its uppermost position (not shown), the upper end of cam 228b abuts radially outwardly projecting lugs 230a integrally formed on the upper ends of a plurality of dogs 230 circumferentially spaced about annular space 222. This causes the lower ends of dogs 230 to pivot radially outwardly, in a manner well known in the art, so that their lower ends can clear flange 202 of wellhead 200 as the connector is being run in.

Figures 8, 9:
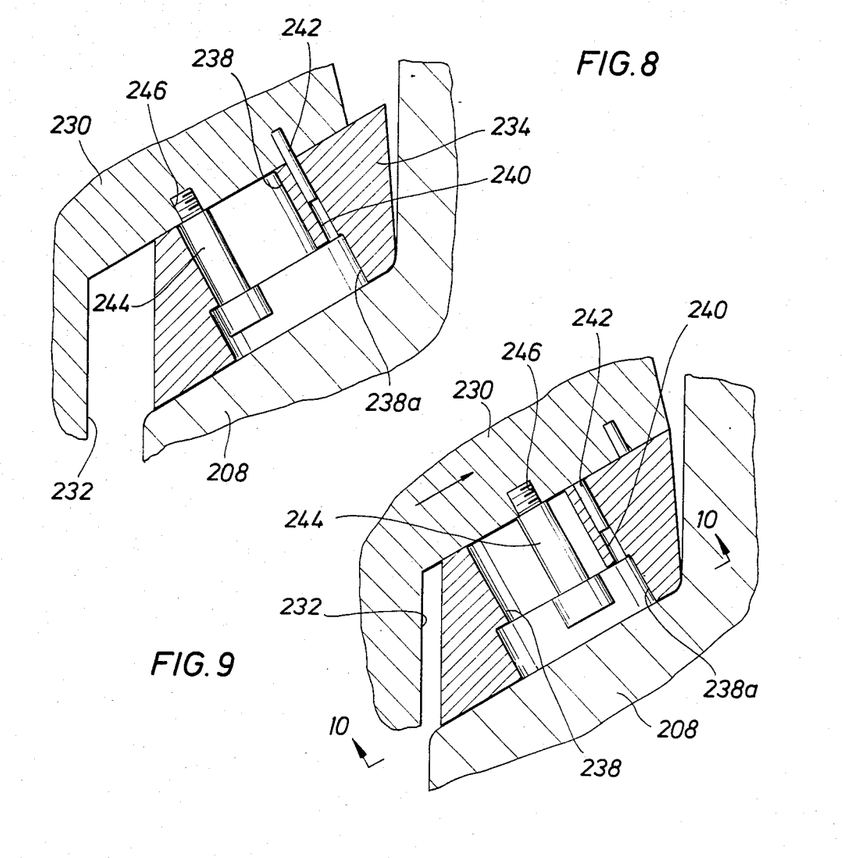
FIG. 8 is a further enlarged detailed sectional view.
FIG. 9 is a view similar to that of FIG. 8 showing the parts in another position.
Figure 10:
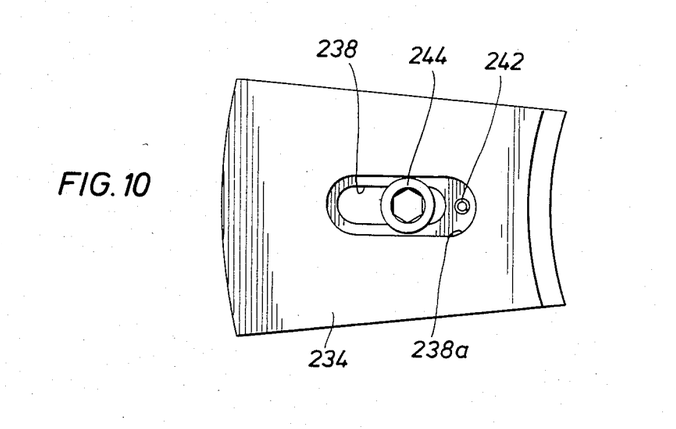
FIG. 10 is a view taken along line 10—10 in FIG. 9.

Each of the dogs 230 has, on its radially inner side, a recess 232 which generally opposes flanges 202 and 208. Carried within each recess 232 are a pair of bearing members 234 and 236, mounted respectively on the upper and lower end surfaces of the recess 232. As best shown in FIGS. 8 and 10, bearing member 234 has a slot 238 extending generally vertically therethrough, slot 238 being further enlarged in both length and width at 238a. One end of the enlarged area 238a communicates with a bore 240 extending parallel to slot 238, but separated therefrom, and permits access to bore 240 whereby a shear pin 242 can be implaced into bore 240 and an opposed recess in dog 230. Thus, pin 242 initially holds bearing member 234 in a desired position with respect to dog 230, more specifically, a position in which bearing member 234 projects slightly radially inwardly from recess 232. Slot 238 and its enlarged end portion 238a likewise permit a screw 244 to have its end threaded into a tapped bore 246 in the upper surface of recess 232. The remainder of the shank of screw 244 is slideably received in the smaller portion of slot 238, while the head of screw 244 is received in the enlarged portion 238a of the slot and abuts the shoulder formed between the smaller and enlarged portions of the slot. Thus, the head of screw 244 retains bearing member 244 from being completely separated from dog 230 after pin 242 is sheared. Referring again to FIG. 6, bearing member 236 is similarly secured to the lower surface of recess 232 by shear pin 246 and screw 248.

While the space between flanges 202 and 208 has been exaggerated in FIG. 6 for purposes of illustration, it is understood in the art that, after the wellhead connector has been emplaced on the wellhead 200, the two flanges are not tightly urged together. The under surface 204 of flange 202 is inclined radially outwardly and upwardly, and serves as a latching surface in a manner to be described more fully below. The oppositely directed upper surface of flange 208 is inclined radially outwardly and downwardly in mirror image fashion. As actuator 224, 228 is urged downwardly, the radially outwardly and downwardly inclined inner surface of cam 228b engages the correspondingly inclined outer surfaces of dogs 230 to pivot the dogs radially inwardly, bringing recesses 232 into receiving relation to flanges 202 and 208. Bearing members 234 and 236 will move inwardly along with dogs 230 until the radially inner ends of the bearing members come into abutment with the wellhead 200 and inner connector portion 206 adjacent their respective flanges 202 and 208. FIGS. 6 and 8 show the apparatus in such position. It should be noted that the sizing of recesses 232 and bearing members 234 and 236 is such as to permit the aforementioned radially inward movement to occur without resistance from either the main body of the connector or the wellhead.

Figure 7:
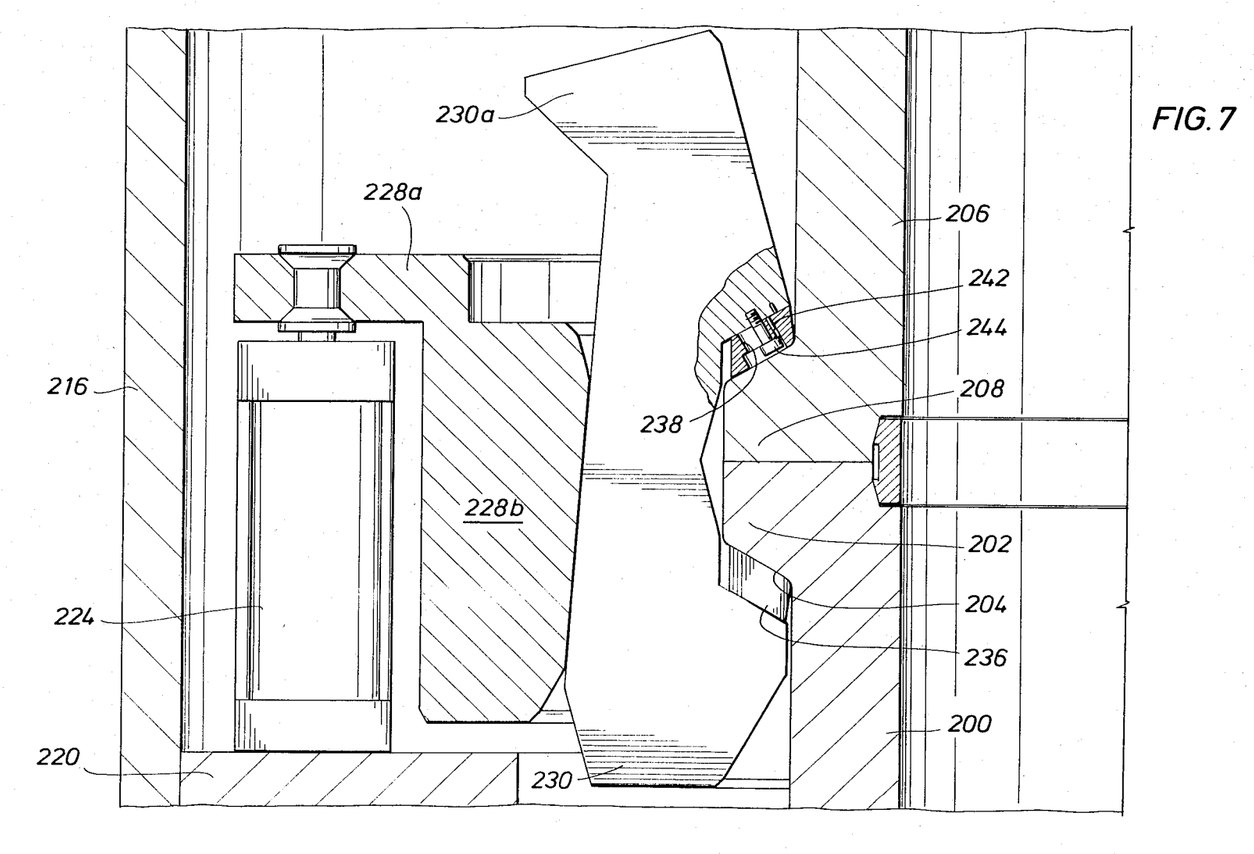
FIG. 7 is an enlarged partial sectional view of the apparatus of FIG. 6 with the support means fully extended.

As the actuator 224, 228 continues to move downwardly from the position of FIG. 6 to that of FIG. 7, it exerts further radial force on dogs 230, shearing pins 242 and 246, and thereby permitting dogs 230 to be extended further radially inwardly with respect to bearing members 234 and 236. The upper and lower surfaces of bearing members 234, as well as the adjacent upper surfaces of recesses 32 are inclined in the same general direction as the adjacent upper surface of flange 208. Similarly, the upper and lower surfaces of bearing members 236, and the lower surfaces of recesses 232 are inclined in the same general direction as the lower or latching surfaces 204 of flange 202. Thus, as dogs 230 move radially inwardly with respect to the flanges 202 and 208 and the abutting bearing members 234 and 236, the dogs will act as wedges to draw flanges 202 and 208 into tight longitudinal engagement as shown in FIG. 7.

During the above described movement, it can be seen that bearing members 236 serve as the latch members, their upper surfaces serving as the latch surfaces for abutment with latch surface 204 of flange 202. The lower surfaces of bearing members 236 and the abutting lower surfaces of recesses 232 serve as the support surfaces which prevent separation of the latch surfaces. The upper bearing members 234 aid the movement of dogs 230. However, it can be understood that the upper bearing members could be omitted, and recess 232 sized for its upper surface to directly engage flange 208. Where upper bearing members 204 are employed, once they come into abutment with the connector body portion 206 above flange 208, they effectively act as a part of the main body of the connector and provide a bearing surface thereon for dogs 230. In any event, it can be seen that, with dogs 230 extended in to their inner positions, the upper surfaces of recesses 232 and flange 208 oppose each other, and will effectively limit downward movement of dogs 230 relative to the main body of the connector either by direct abutment, or via the bearing members 234 interposed therebetween.

To unlatch and retrieve the wellhead connector, actuator means 224, 228 is urged upwardly. When the upper surface of cam 228b reaches the lugs 230a of dogs 230, continued upward movement of the actuator means will pivot the lower ends of dogs 230 radially outwardly, carrying bearing members 234 and 236 with them via screws 244 and 248. When the lower portions of dogs 230, and the attached bearing members 236 have cleared flanged 202, the connector can be retrieved. It should be understood that various other features, such as a means for locking the apparatus in latched position, could be included in the simplified version of the connector illustrated in FIGS. 6–10.

The above represent only two exemplary embodiments of the invention, and numerous modifications will suggest themselves to those of skill in the art. By way of example only, in the embodiments described and shown above, the latch means and support means first move radially inwardly jointly, followed by further radially inward movement of the support means. In other embodiments, the latches might first move radially inwardly independently of the support means followed by movement of the support means themselves. As used herein, the term "successive movement" will refer to either of these two patterns of movement, as well as to any other pattern in which movement by the latch means, with or without the support means, is followed by movement of the support means independently of the latch means.

Other modifications might involve the form of the various parts of the invention. For example, in the embodiments shown, the support means is in the form of a plurality of circumferentially spaced members. In other embodiments, the support means might be a single member, such as a split ring. Still other modifications might involve the means for releasing the support means and/or the latch means from their extended positions. Even further modifications will suggest themselves to those of skill in the art. Accordingly, it is intended that the scope of the present invention be limited only by the claims which follow.

I claim:

1. Connector apparatus for connection to a wellhead in generally coaxial alignment therewith, comprising:
    a generally tubular main body;
    latch means carried by said main body for generally radial extension and retraction with respect thereto;
    support means carried by said main body longitudinally adjacent said latch means for generally radial extension and retraction with respect thereto at least partially independently of said latch means, said support means and said main body having a set of opposed slide surfaces which undergo generally radial relative movement during such extension and retraction of said support means, said support means and said latch means having a set of opposed, abutting support surfaces, at least one of said sets of opposed surfaces being inclined with respect to the path of movement of said support means for wedging said latch means longitudinally as said support means is so radially extended; and
    actuator means on said main body and operatively associated with said latch means and said support means to successively extend said latch means and said support means.

2. The apparatus of claim 1 wherein during such extension and retraction, each of said sets of opposed surfaces undergoes generally radial relative sliding movement.

3. Apparatus for connecting a pair of tubular bodies in generally coaxial alignment comprising:
    one such tubular body;
    latch means carried by said one body for generally radial extension and retraction with respect thereto, said latch means being adapted, when so extended, to engage another tubular body to limit relative longitudinal movement between said tubular bodies;
    rigid support means carried by said one body adjacent said latch means for generally radial extension and retraction with respect thereto, rigidly and at least partially independently of said latch means, said support means, when so extended, wedging with respect to said latch means and said one body; and actuator means on said one body and operatively associated with said latch means and said support means to so extend said latch means and said support means successively.

4. Apparatus for connecting a pair of tubular bodies in generally coaxial alignment comprising:

one such tubular body;

latch means carried by said one body for extension in a first generally radial direction and retraction in a second generally radial direction opposite said first radial direction with respect to said one body, said latch means having generally longitudinally facing latching surfaces adapted to be opposed to and engageable with latching surfaces of another tubular body when said latch means is so extended to limit relative movement between said latch means and such other body in a first longitudinal directional mode;

support means carried by said one body adjacent said latch means for extension in said first generally radial direction and retraction in said second generally radial direction with respect to said one body at least partially independently of said latch means, said support means and said latch means having respective generally longitudinally facing support surfaces opposed to each other when said latch means and said support means are both so extended, said support surface of said support means being adapted to undergo movement generally in said first radial direction during such extension of said support means and movement generally in said second radial direction during such retraction of said support means, said support surface of said latch means facing generally longitudinally oppositely from its latching surface, and said support means and said one body having means cooperative therebetween for resisting movement of said support means longitudinally away from said support surface of said latch means, whereby said support means longitudinally supports said latch means when said latch means and said support means are both so extended; and actuator means on said one body and operatively associated with said latch means and said support means to so extend said latch means and said support means successively.

5. The apparatus of claim 4 wherein said support means, when so extended, wedges between said latch means and said one body.

6. The apparatus of claim 5 wherein said means cooperative between said support means and said one body include opposed abutting slide surfaces on said support means and said one body extending parallel to the path of movement of said support means; wherein each of said sets of opposed surfaces undergoes generally radial relative sliding movement during such extension and retraction of said support means; and wherein said support surfaces are inclined with respect to the path of movement of said support means for wedging said latch means longitudinally as said support means is so radially extended.

7. The apparatus of claim 6 wherein said actuator means includes longitudinally extendable and retractable drive means carried by said main body and having cam surfaces engagable with said latch means and said support means for radially extending said latch means and said support means as said drive means is longitudinally extended.

8. The apparatus of claim 7 wherein said cam surfaces are arranged in a generally stepped configuration on said drive means for successive extension of said latch means and said support means.

9. The apparatus of claim 7 wherein said drive means, in a longitudinally extended position, radially abuts said latch means and said support means to retain said latch means and said support means in a radially extended position.

10. The apparatus of claim 9 further comprising lock means associated with said drive means for locking said drive means in said extended position.

11. The apparatus of claim 7 further comprising release means cooperative between said drive means and said support means to at least partially radially retract said support means as said drive means is longitudinally retracted.

12. The apparatus of claim 11 further comprising link means interconnecting said latch means and said support means to limit relative radial movement therebetween, the amount of relative radial movement permitted by said link means being less than the amount of radial movement of said support means during its extension and retraction whereby, after partial retraction of said support means, further retraction of said support means will cause retraction of said latch means.

13. The apparatus of claim 12 wherein said link means and said drive means are cooperative to cause joint radial extension of said latch means and said support means during a first portion of the extension stroke of said drive means and cause successive additional radial extension of said support means independently of said latch means during a second portion of the extension stroke of said drive means.

14. The apparatus of claim 4 further comprising link means interconnecting said latch means and said support means to limit relative radial movement therebetween, the amount of relative radial movement permitted by said link means being less than the amount of radial movement of said support means during its extension and retraction, whereby, after partial retraction of said support means, further retraction of said support means will cause retraction of said latch means.

15. The apparatus of claim 4 wherein said other body is a wellhead body and said one body is a connector body.

16. The apparatus of claim 15 wherein said latch means comprises a first set of circumferentially spaced members.

17. The apparatus of claim 4 wherein said support means, when so extended, wedges with respect to said latch means and said one body.

18. The apparatus of claim 17 wherein said means cooperative between said support means and said one body include opposed surfaces on said support means and said one body and bearing means between said opposed surfaces.

* * * * *